US012678363B2

(12) United States Patent
Yamamoto et al.

(10) Patent No.: US 12,678,363 B2
(45) Date of Patent: Jul. 14, 2026

(54) MOVEMENT SUPPORTING DEVICE, MOVEMENT SUPPORTING METHOD, AND PROGRAM

(71) Applicant: OMRON Corporation, Kyoto (JP)

(72) Inventors: Kazuo Yamamoto, Kyoto (JP); Tomohiro Yabuuchi, Kyoto (JP); Naoto Iwamoto, Kyoto (JP); Endri Rama, Kyoto (JP); Norio Yoshikawa, Kyoto (JP); Yohei Niimi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 519 days.

(21) Appl. No.: 17/908,403

(22) PCT Filed: Feb. 10, 2021

(86) PCT No.: PCT/JP2021/004984
§ 371 (c)(1),
(2) Date: Aug. 31, 2022

(87) PCT Pub. No.: WO2021/181992
PCT Pub. Date: Sep. 16, 2021

(65) Prior Publication Data
US 2023/0338223 A1      Oct. 26, 2023

(30) Foreign Application Priority Data

Mar. 13, 2020    (JP) ................................. 2020-043948

(51) Int. Cl.
*G06K 9/00*          (2022.01)
*A61H 3/06*          (2006.01)
(Continued)

(52) U.S. Cl.
CPC ........... *A61H 3/061* (2013.01); *G06T 7/0002* (2013.01); *A61H 2201/1659* (2013.01);
(Continued)

(58) Field of Classification Search
CPC ............ A61H 3/061; A61H 2201/1659; A61H 2201/5007; A61H 2201/5092; G06T 7/0002; G06T 2200/24; G09B 21/006
See application file for complete search history.

(56) References Cited

U.S. PATENT DOCUMENTS

| | | | |
|---|---|---|---|
| 10,052,252 B2 * | 8/2018 | Lin | ......................... G16H 20/30 |
| 10,710,237 B2 * | 7/2020 | Kumeno | .................. A61H 3/00 |

(Continued)

FOREIGN PATENT DOCUMENTS

| | | | | |
|---|---|---|---|---|
| EP | 3293490 A1 * | 3/2018 | ............. | G01C 21/28 |
| JP | H11221259 A | 8/1999 | | |

(Continued)

OTHER PUBLICATIONS

Brewer, Robin N., and Vaishnav Kameswaran. "Understanding the power of control in autonomous vehicles for people with vision impairment." Proceedings of the 20th International ACM SIGAC-CESS Conference on Computers and Accessibility. 2018. (Year: 2018).*

(Continued)

*Primary Examiner* — Avinash Yentrapati
(74) *Attorney, Agent, or Firm* — CANTOR COLBURN LLP

(57) ABSTRACT

A movement support device comprises: an imaging device that acquires a captured image; a controller that calculates a safety degree based on the captured image; a storage that stores a necessary safety degree table in which a predetermined action candidate as an action that can be executed by the user and a necessary safety degree indicating a safety degree necessary for the user to safely perform an action indicated by the predetermined action candidate are stored in association with each other; an input unit that receives input of a selection operation by the user to select an action
(Continued)

candidate desired by the user from among the predetermined action candidates; and an output unit.

5 Claims, 6 Drawing Sheets

(51) Int. Cl.
  *G06T 7/00* (2017.01)
  *G09B 21/00* (2006.01)
(52) U.S. Cl.
  CPC ................ *A61H 2201/5007* (2013.01); *A61H 2201/5092* (2013.01); *G06T 2200/24* (2013.01); *G09B 21/006* (2013.01)

(56) References Cited

U.S. PATENT DOCUMENTS

| | | | | |
|---|---|---|---|---|
| 2016/0030201 | A1* | 2/2016 | Zoss ...................... | A61H 3/008 |
| | | | | 623/24 |
| 2017/0001656 | A1* | 1/2017 | Katayama ................ | A61H 3/04 |
| 2017/0136295 | A1* | 5/2017 | Tholkes ................. | A61B 5/112 |
| 2018/0073890 | A1 | 3/2018 | Patel | |
| 2018/0235832 | A1* | 8/2018 | Yamada .................. | G01S 17/93 |
| 2019/0313948 | A1* | 10/2019 | Matsunaga ............. | G06V 40/20 |
| 2019/0318600 | A1* | 10/2019 | Tanaka ................. | G08B 25/006 |

FOREIGN PATENT DOCUMENTS

| | | | |
|---|---|---|---|
| JP | 2001318594 | A1 | 11/2001 |
| JP | 2007102488 | A | 4/2007 |
| WO | 2013069110 | A1 | 5/2013 |

OTHER PUBLICATIONS

Hong, Dennis, et al. "Development of a semi-autonomous vehicle operable by the visually-impaired." 2008 IEEE International Conference on Multisensor Fusion and Integration for Intelligent Systems. IEEE, 2008. (Year: 2008).*

International Search Report for International Application No. PCT/JP2021-004984; Date of Mailing, Apr. 20, 2021.

PCT Written Opinion of the International Searching Authority for International Application No. PCT/JP2021/004984; Date of Mailing, Apr. 20, 2021.

EPO Extended European Search Report for corresponding EP Application No. 21768482.8; Issued Mar. 6, 2024; 9 pages.

* cited by examiner

51

| ACTION CANDIDATE | NECESSARY SAFETY DEGREE |
|---|---|
| STOP TO TALK | T1 |
| REST | T2 |
| SIT ON BENCH | T3 |
| GO TO RESTROOM | T4 |
| CONFIRM CURRENT LOCATION | T5 |
| LOOK FOR ACQUAINTANCES | T6 |
| GET ON THE BUS AT THE DESIRED TIME | T7 |

*Fig.4*

MOVEMENT SUPPORTING DEVICE, MOVEMENT SUPPORTING METHOD, AND PROGRAM

CROSS REFERENCE TO RELATED APPLICATIONS

This is the U.S. national stage of application No. PCT/JP2021/004984, filed on Feb. 10, 2021. Priority under 35 U.S.C. § 119 (a) and 35 U.S.C. § 365 (b) is claimed from Japanese Application No. 2020-043948, filed Mar. 13, 2020, the disclosure of which is also incorporated herein by reference.

TECHNICAL FIELD

The present disclosure relates to a movement support device that supports movement of a user.

BACKGROUND ART

Patent Document 1 discloses a walking supporting system for a visually impaired person. The system extracts information regarding presence of an obstacle and its position from a stereo image, and an information transmission device emits the information by voice information or tactile information. This enables a visually impaired person or the like who is a user to more specifically grasp information regarding navigation such as the presence of an obstacle, its position, and distance.

PRIOR ART DOCUMENT

Patent Document

Patent Document 1: JP 2001-318594 A

SUMMARY OF THE INVENTION

Problems to be Solved by the Invention

However, the invention disclosed in Patent Document 1 does not receive input of an action desired by the user and performs only navigation. The invention disclosed in Patent Document 1 does not calculate a safety degree indicating the level of safety regarding the user based on an image.

Means for Solving the Problems

A movement support device according to an aspect of the present disclosure is a movement support device that supports movement of a user, the movement support device including:

an imaging device that captures an image of an environment around the user to acquire a captured image;

a controller that calculates a safety degree indicating a level of safety regarding the user based on the captured image;

a storage that stores a necessary safety degree table in which a predetermined action candidate as an action that can be executed by the user and a necessary safety degree indicating a safety degree necessary for the user to safely perform an action indicated by the predetermined action candidate are stored in association with each other;

an input unit that receives input of a selection operation by the user to select an action candidate desired by the user from among the predetermined action candidates; and an output unit, in which the controller acquires a necessary safety degree corresponding to a selected action candidate from the necessary safety degree table when there has been input of the selection operation, does not support the user in achieving the selected action candidate when the safety degree having been calculated is less than a necessary safety degree corresponding to the selected action candidate, and controls the output unit to support the user in achieving the selected action candidate when the safety degree having been calculated is a necessary safety degree or more corresponding to the selected action candidate.

EFFECTS OF THE INVENTION

The movement support device according to an aspect of the present disclosure can secure the safety of a user and support the user in achieving an action desired by the user depending on the safety degree.

BRIEF DESCRIPTION OF THE DRAWINGS

FIG. 4 is a diagram illustrating an example of the necessary safety degree table.

MODE FOR CARRYING OUT THE INVENTION

Figure 1:
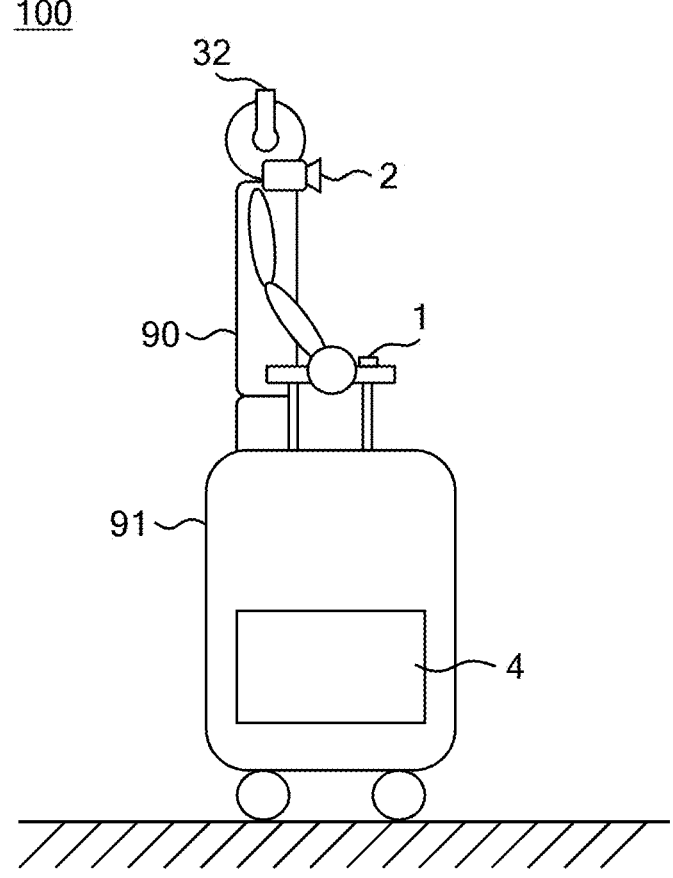
FIG. 1 is a schematic diagram illustrating an application example of a movement support device according to an embodiment of the present disclosure.

An embodiment of a movement support device according to the present disclosure will be described below with reference to the accompanying drawings. Note that in the following embodiment, similar components are given identical reference numerals.

1. Application Example

FIG. 1 is a schematic diagram illustrating an application example of a movement support device 100 according to the present embodiment. By leading to, in a self-propelled manner, a place where a user 90 wants to go, the movement support device 100 performs a navigation operation of supporting movement of the user 90, for example. The navigation includes not only guiding the user 90 to a destination but also guiding the user 90 to a safe place.

The movement support device 100 includes, for example, a controller 4 such as a CPU, an input unit 1 such as a button, a camera 2, and an audio output unit 32 such as a headphone. The camera 2 is an example of the imaging device of the present disclosure. The controller 4 is mounted on a robot 91 driven to be self-propelled, for example. The robot 91 may have a suitcase shape as illustrated. The input unit 1, the camera 2, and the audio output unit 32 are connected to the controller 4 in a wired or wireless manner.

The user 90 may have various action requests in motion as well as getting to the destination. For example, the user 90 may desire communication such as talking with an acquaintance. If the robot 91 always executes only heading toward the destination, it is not possible to achieve an action request of the user 90 that is, for example, to stop on the way to talk with an acquaintance. In order to achieve such an action request, for example, in a case of coming across an acquaintance or the like in motion, the movement support device 100 is required to automatically stop or guide the user 90 to near the acquaintance. On the other hand, if priority is always given to achieving the action request of the user 90 even in a dangerous situation such as a case where the user 90 is at a pedestrian crossing, the safety of the body of the user 90 is not secured.

Therefore, the movement support device 100 receives an action request of the user 90 via the input unit 1. For example, the user 90 operates the input unit 1 to select an action of "talking with an acquaintance" from among predetermined action candidates. Alternatively, in a case where the user 90 inputs that "I want to talk with an acquaintance" using the input unit 1, the controller 4 may select an action according to the input information from a table stored in the storage. The controller 4 of the movement support device 100 calculates a safety degree S indicating the level of safety regarding the user 90 based on an image captured by the camera 2. In a case where the calculated safety degree S is less than a necessary safety degree T indicating the safety degree necessary for the user 90 to safely achieve "talking with an acquaintance", the controller 4 does not support achievement of "talking with an acquaintance" and continues navigation as it is, for example. When the safety degree S is the necessary safety degree T or more, the controller 4 may support achievement of "talking with an acquaintance" by automatically stopping or guiding the user 90 to near the acquaintance. In this manner, the movement support device 100 achieves an action request of the user 90 while securing the safety of the user 90.

The present disclosure is applicable to the movement support device 100 that supports movement of the user 90 who is a visually impaired person, for example. For example, the movement support device 100 finds an acquaintance registered in advance based on a captured image by the camera 2 and makes a notification to the user 90 of the presence of the acquaintance via the audio output unit 32. The user 90 operates the input unit 1 to input, to the controller 4, action request information indicating that the user wants to have a conversation with the acquaintance. The controller 4 does not support achievement of the action request in a case where the safety degree S is less than the necessary safety degree T necessary for conversation with an acquaintance on the spot. The controller 4 may support achievement of "talking with an acquaintance" when the safety degree S is the necessary safety degree T or more. In this manner, the movement support device 100 achieves social activities of the user 90 such as communication while ensuring the safety of the user 90.

The user 90 may be an autonomously movable robot. In this case, the components of the movement support device 100 such as the camera 2, the controller 4, and the audio output unit 32 may be incorporated in the robot. In this case, the robot is basically self-propelled to the destination, but may select an action candidate to actually execute from among predetermined action candidates according to the captured image of the camera 2 and the safety degree S. This enables the robot to smoothly communicate with the human when the human and the robot coexist in society while ensuring the safety of the robot.

2. Configuration Example

Figure 2:
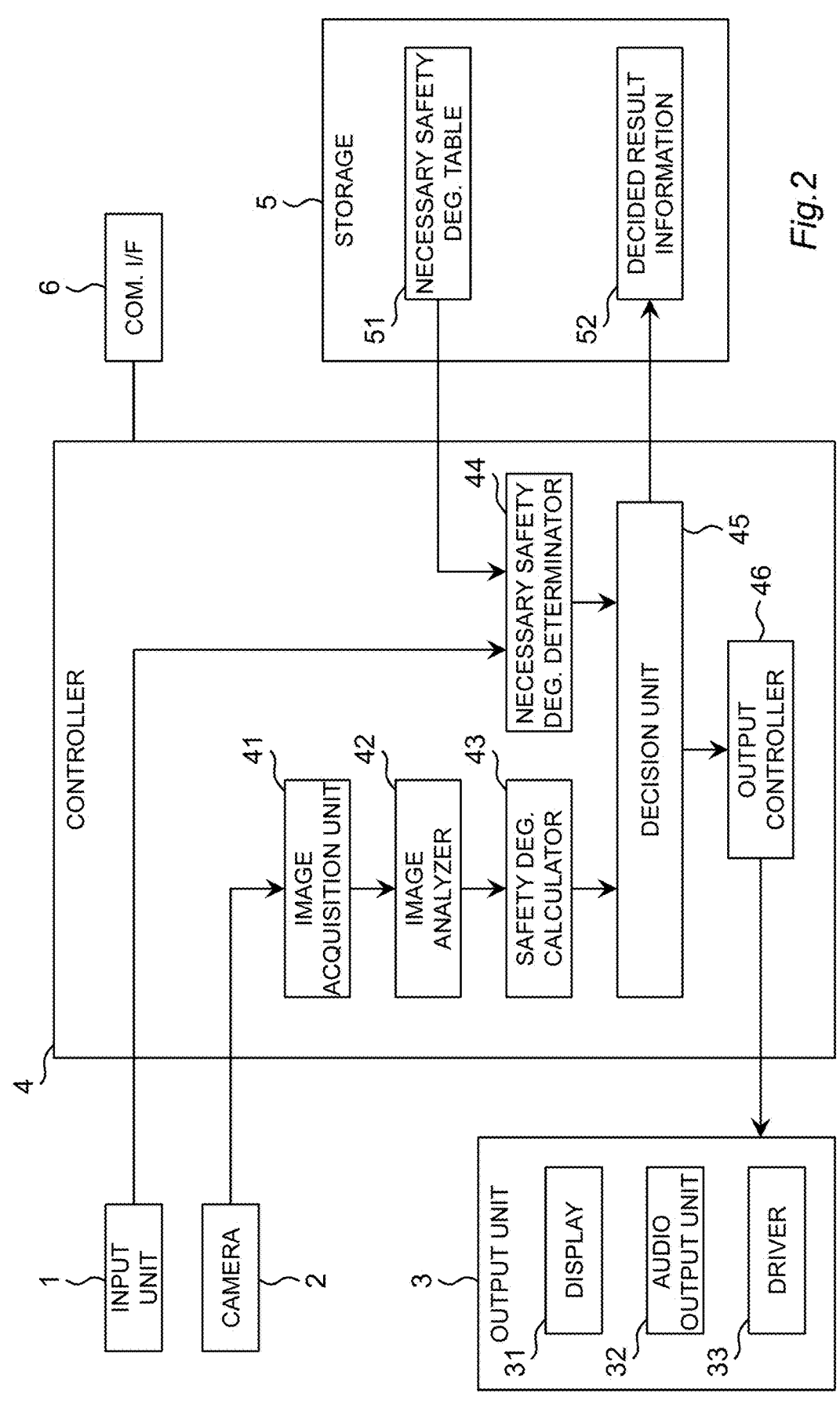
FIG. 2 is a block diagram illustrating a configuration example of a movement support device according to the present embodiment.

FIG. 2 is a block diagram illustrating a configuration example of the movement support device 100 according to the present embodiment. The movement support device 100 includes the input unit 1, the camera 2, an output unit 3, the controller 4, a storage 5, and a communication interface (I/F) 6.

The input unit 1 is an input device such as, for example, a keyboard, a touch pad, a touchscreen, a button, a switch, or a voice input device. For example, by operating the input unit 1, the user 90 can input action request information described later.

The camera 2 is an imaging device that captures an image of an environment around the user 90 to form a captured image. For example, the camera 2 forms a captured image by a solid-state imaging element such as a complementary MOS (CMOS) or a charge coupled device (CCD). The camera 2 is, for example, a wearable camera that can be worn by the user 90. The camera 2 may be mounted on the robot 91 and baggage of the user 90 such as a backpack.

The output unit 3 is an output device that performs output in accordance with control by the controller 4. The output unit 3 includes, for example, a display 31, the audio output unit 32, and a driver 33. The display 31 is a display device such as, for example, a liquid crystal display, an organic EL display, and a projector. The audio output unit 32 includes, for example, audio device such as a speaker, an earphone, and a headphone. The driver 33 includes a drive device such as a motor, wheels, and a steering for moving the movement support device 100, for example.

The controller 4 is an information processing device that includes a central processing unit (CPU), a random access memory (RAM), and read only memory (ROM), and performs control of each component of the movement support device 100 in response to information processing. The controller 4 includes, for example, an image acquisition unit 41, an image analyzer 42, a safety degree calculator 43, a necessary safety degree determinator 44, a decision unit 45, and an output controller 46. By the controller 4 executing a necessary program, the image acquisition unit 41, the image analyzer 42, the safety degree calculator 43, the necessary safety degree determinator 44, the decision unit 45, and the output controller 46 may execute processing of which each component is in charge. Such a program may be stored in the storage 5. When executing a necessary program, the controller 4 expands, in the RAM, the target program stored in the storage 5. The controller 4 interprets and executes, by the CPU, the program expanded in the RAM to control each component. An operation example of each component will be described later.

The storage 5 is a medium that accumulates information on the program and the like by an electrical, magnetic, optical, mechanical, or chemical action so that a computer, another device, a machine, or the like can read the information on the recorded program or the like. The storage 5 is, for example, an auxiliary storage device such as a hard disk drive or a solid state drive. The storage 5 stores, for example, a necessary safety degree table 51, a decided result information 52, a program executed by the controller 4, and the like. The storage 5 may store map data used for movement supporting to a destination. The storage 5 may include a main storage device such as the RAM.

The communication interface 6 includes an interface circuit for enabling communication connection between the movement support device 100 and external equipment. The communication interface 6 performs communication in conformity to a standard such as IEEE 802.3, IEEE 802.11, Wi-Fi (registered trademark), LTE, 3G, 4G, and 5G, for example. The communication interface 6 may be an interface circuit that performs communication in conformity to a standard such as Universal Serial Bus (USB), HDMI (registered trademark), IEEE 1394, and Bluetooth (registered trademark). For example, the controller 4 can acquire map data from an external server via the communication interface 6 and a network.

The movement support device 100 is mounted on, for example, a suitcase, a self-propelled robot, and the like. The movement support device 100 may be a wearable device worn by the user 90 on his/her back or the like. The movement support device 100 may be attached to a bag such as a backpack.

In the present embodiment, an example in which each function of the controller 4 is implemented by the CPU will be described. However, some or all of the above functions may be implemented by one or a plurality of dedicated processors. Regarding components of the controller 4, omission, replacement, and addition of functions may be performed as appropriate depending on an embodiment. The controller 4 may include various semiconductor integrated circuits such as a CPU, an MPU, a GPU, a microcomputer, a DSP, an FPGA, and an ASIC.

3. Operation Example

In principle, the movement support device 100 operates in a normal mode for supporting movement of the user 90 by guiding the way or the like. The normal mode can also be called "navigation mode". The movement support device 100 operates by switching between the normal mode and the request execution mode in response to the safety degree S, input of action request information from the user 90, and the like. Hereinafter, operation in each mode and mode switching will be described with reference to FIG. 3 and FIG. 4.

3-1. Normal Mode

Figure 3:
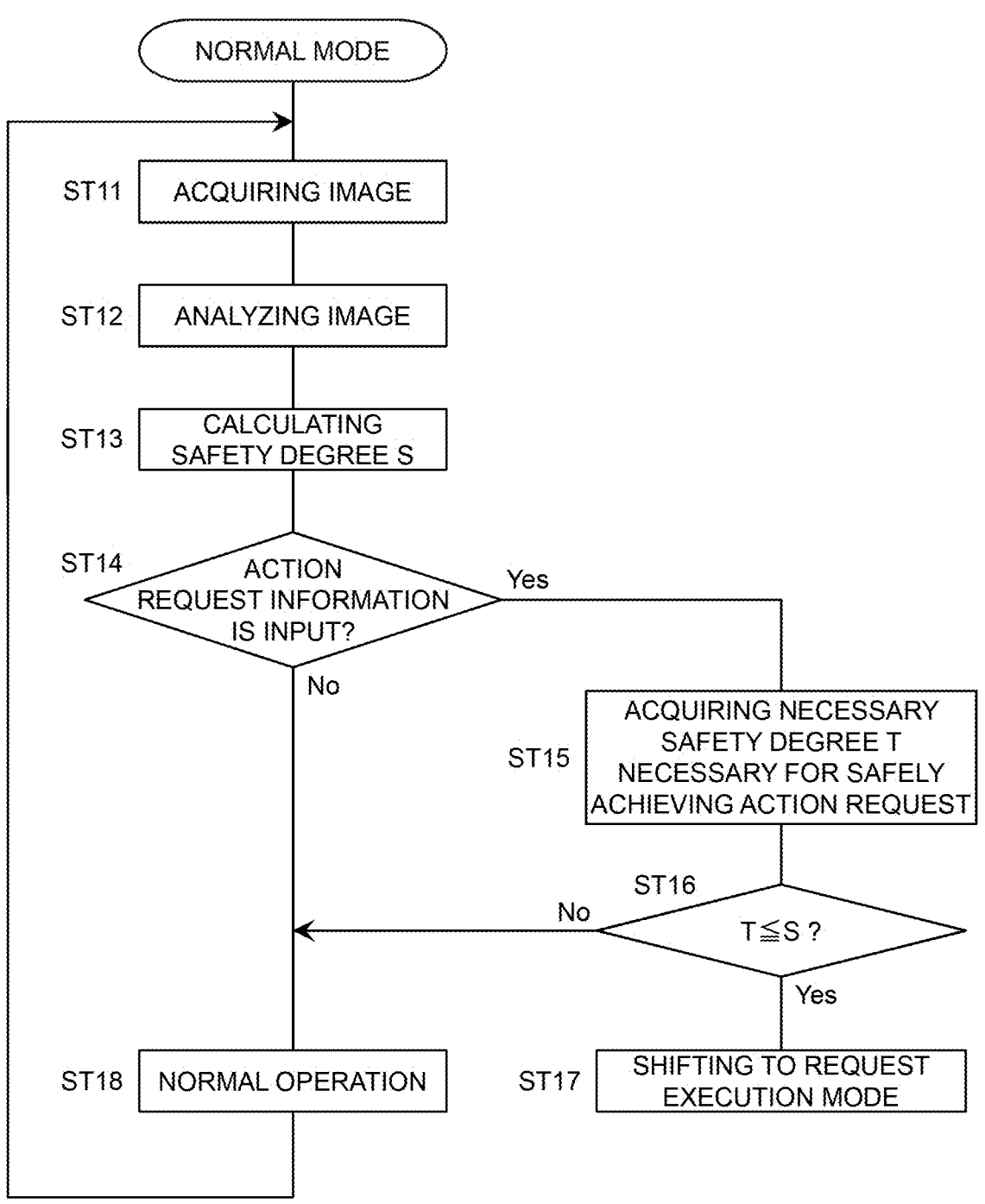
FIG. 3 is a flowchart presenting an operation example of the movement support device in a normal mode.

FIG. 3 is a flowchart presenting an operation example of the movement support device 100 in the normal mode. Each processing presented in FIG. 3 is executed by the controller 4, for example.
(ST11)
First, the image acquisition unit 41 acquires an image captured by the camera 2 (ST11). The camera 2 captures an image of a periphery of the user 90 at a predetermined frame rate, for example, and sequentially generates image data. For example, the controller 4 executes the processing presented in the flowchart of FIG. 3 for each frame.
(ST12)
Next, the image analyzer 42 analyzes the image acquired in step (ST) 11 and detects an object in the image such as an obstacle, a target, or a person (ST12). The image analyzer 42 may analyze a position, a state, and the like of the detected object. For example, the image analyzer 42 detects a travel direction of a moving body such as an automobile, an orientation of an eye line of a person, and the like.
(ST13)

Next, the safety degree calculator 43 calculates the safety degree S based on the image (ST13). Specifically, the safety degree calculator 43 calculates the safety degree S based on the result of the image analysis in ST12. For example, the safety degree calculator 43 calculates the safety degree S by comprehensively considering first to fifth indices S1 to S5. Here, the first to fifth indices S1 to S5 can take values from 0 to 1, for example, and are decided by the safety degree calculator 43 in the following manner.

For example, the first index S1 is decided based on the weather, brightness, or the like of the environment around the user 90. For example, the safety degree calculator 43 sets the first index S1 to 0 when the weather is snow and the surroundings are dark and sets the first index S1 to 1 when the weather is sunny and the surroundings are bright. The first index S1 is not limited to one that takes a higher value as the surroundings are brighter. For example, when it is assumed that the surrounding environment is so bright that the user 90 feels dazzled, the safety degree calculator 43 may set the first index S1 to a low level value, for example, 0.1.

For example, the second index S2 is calculated based on the state of the ground where the user 90 is. For example, the safety degree calculator 43 sets the second index S2 to a small value when the user 90 is on a wet ground or a staircase and sets the second index S2 to a large value when the user 90 is on a dry, flat ground.

For example, the third index S3 is calculated based on the presence or absence of an obstacle in the environment around the user 90 and the nature of the obstacle. For example, the safety degree calculator 43 sets the third index S3 to 1 when there is no obstacle in the environment around the user 90. On the other hand, when there is a dangerous obstacle such as heavy machinery in the environment around the user 90, the safety degree calculator 43 sets the third index S3 to a small value.

For example, the fourth index S4 is calculated based on the presence or absence, nature, moving speed, moving direction, and the like of a moving body in the environment around the user 90. For example, the safety degree calculator 43 sets the fourth index S4 to 1 when there is no moving body in the environment around the user 90. On the other hand, the safety degree calculator 43 sets the fourth index S4 to a small value when there is a moving body such as an automobile moving in the environment around the user 90 and sets the fourth index S4 to a smaller value when such a moving body is moving toward the user 90 at a high speed.

For example, the fifth index S5 is calculated based on the presence or absence, the moving speed, and the moving direction of people around the user 90. For example, the safety degree calculator 43 sets the fifth index S5 to a small value when the user 90 is on a crowded road or in an intersection.

The safety degree calculator 43 calculates the safety degree S based on the first to fifth indices S1 to S5 as described above. For example, the safety degree calculator 43 may set the total sum of the first to fifth indices S1 to S5 as the safety degree S. The safety degree S may be normalized to take a value of 0 to 1. For example, the safety degree calculator 43 may set, as the safety degree S, a value normalized by multiplying the total sum of the first to fifth indices S1 to S5 by $\frac{1}{5}$. Alternatively, the safety degree calculator 43 may perform different weighting on each of the first to fifth indices S1 to S5, and set the total sum of the weighted indices as the safety degree S. Note that the safety degree calculator 43 does not necessarily have to calculate the safety degree S using all of the first to fifth indices S1 to S5 and may calculate the safety degree S using one or more of these indices. The safety degree calculator 43 may calculate the safety degree S using more than five indices. (ST14, ST15)

Next to ST13, when there has been input of the action request information (Yes in ST14), the necessary safety degree determinator 44 acquires from the necessary safety degree table 51, the necessary safety degree T necessary for safely achieving the action request indicated by the action request information (ST15).

Here, the necessary safety degree T is an index indicating the level of safety necessary for the user 90 to safely perform an action indicated by the action request information. The case where there has been input of action request information (in the case of Yes in ST14) includes a case where there has been input of a selection operation by the user 90 for selecting an action desired by the user 90 from among predetermined action candidates as actions that can be executed by the user 90. When the user 90 is an autonomously movable robot, the case where there is input of action request information (in the case of Yes in ST14) includes a case where the user 90 has performed processing of selecting one or a plurality of action candidates from among predetermined action candidates as actions that can be executed. Acquiring (ST15) the necessary safety degree T necessary for safely achieving the action request indicated by the action request information from the necessary safety degree table 51 includes acquiring the necessary safety degree T corresponding to the action candidate selected by the input of the selection operation from the necessary safety degree table 51.

The action request information is input to the controller 4 via the input unit 1 by the user 90. The user 90 operates the input unit 1 such as, for example, a keyboard, a touch pad, a touchscreen, a button, a switch, or a voice input device to input action request information indicating a desired action. Alternatively, user 90 operates input unit 1 to select an action corresponding to a desired action from among predetermined action candidates as actions that can be executed by the user 90. For example, the action request information or the predetermined action candidate includes information such as "I want to stop to talk with an acquaintance", "I want to take a break", "I want to sit on a bench", "I want to go to the toilet", "I want to confirm the current location", "I want to look for an acquaintance", and "I want to catch a bus".

FIG. 4 is a diagram illustrating an example of the necessary safety degree table 51. The necessary safety degree table 51 stores, in association with each other, a predetermined action candidate and a necessary safety degree indicating the level of safety necessary for the user 90 to safely perform the action indicated by the predetermined action candidate. The necessary safety degree table 51 exemplified in FIG. 4 stores predetermined action candidates such as "stop to talk", "take a break", "sit on a bench", "go to the toilet", "confirm the current location", "find an acquaintance", and "get on a bus at a desired time". Necessary safety degrees T1 to T7 are associated with each action candidate.

The necessary safety degrees T1 to T7 are determined in advance based on, for example, the level of difficulty for the user 90 to safely execute a corresponding action candidate and/or an index similar to the index in which the safety degree S is calculated in ST13. For example, in order to achieve confirming the current location, it is only sufficient to provide information to the user 90 using the audio output unit 32, and the level of difficulty in safe execution is small, so that the necessary safety degree T5 necessary for confirming the current location is set to a low level value. For example, in order to achieve getting on a bus at a desired time that is about to depart, it is necessary for the user 90 to move at a high speed, and the level of difficulty in safe execution is large. Therefore, the necessary safety degree T7 necessary for getting on a bus at a desired time that is about to depart is set to a high level value. For example, it is considered that stopping to talk can be safely executed unless there is a moving body such as an automobile or a bicycle around. Therefore, the necessary safety degree T1 necessary for stopping to talk may be set as a threshold value only for the fourth index S4 calculated based on the presence or absence, nature, moving speed, moving direction, and the like of the moving body in the environment around the user 90 described above. Thus, depending on the nature of the action candidate, the threshold values for the five indices as described above included in the necessary safety degree T may be weighted in different aspects. (ST16 to 18)

After ST15, the decision unit 45 decides whether or not the safety degree S calculated by the safety degree calculator 43 in ST13 is the necessary safety degree T acquired in ST15 or more (ST16). When the safety degree S is the necessary safety degree T or more (Yes in ST16), the operation mode of the controller 4 shifts from the current normal mode to a request execution mode for supporting the user 90 to achieve the action candidate selected in ST14 (ST17). The request execution mode performs operation of supporting the user 90 to achieve the action corresponding to the action request information input in ST14. When the safety degree S is less than the necessary safety degree T (No in ST16), the operation mode of the controller 4 does not change from the current normal mode, and the controller 4 performs normal operation of supporting movement of the user 90 by guiding the way or the like (ST18).

The normal operation is controlled by, for example, the output controller 46. For example, the output controller 46 controls the display 31 of the output unit 3 to display a destination and a route to the destination in a map displayed on the display 31 such as a display. This enables the user 90 to confirm the destination and the route. The output controller 46 may control the audio output unit 32 of the output unit 3 to guide the way by voice. The output controller 46 may control the driver 33 of the output unit 3 such as the motor, the wheel, and the steering to move the movement support device 100 toward the destination.

As described above, when the safety degree S is less than the necessary safety degree T (No in ST16), the controller 4 does not support the user 90 in achieving the action candidate selected in ST14. In other words, when the safety degree S is less than the necessary safety degree T (No in ST16), the movement support device 100 does not execute output in response to the request of the user 90. When the output in response to the request of the user 90 is executed in such a case, there is a possibility that the safety of the user 90 is not secured. The movement support device 100 can ensure the safety of the user 90 by not executing the output in response to the request of the user 90.

After executing ST18, the controller 4 returns to ST11 and repeats the flow presented in FIG. 3. That is, the flow presented in FIG. 3 is repeated at a constant period unless the process proceeds to ST17 and shifts to the request execution mode. In this manner, an image acquisition step of ST11 is repeated at a predetermined frame rate.

Input of the action request information determined in ST14 may be performed by operation of the user 90 during navigation by the movement support device 100, but the present disclosure is not limited to this. For example, input of the action request information may be performed before the navigation operation. For example, at home, the user 90 may input to the movement support device 100 in advance, action request information indicating that "I want to be notified when coming across a friend". The input action request information is stored in the storage 5, for example.

3-2. Request Execution Mode

Figure 5:
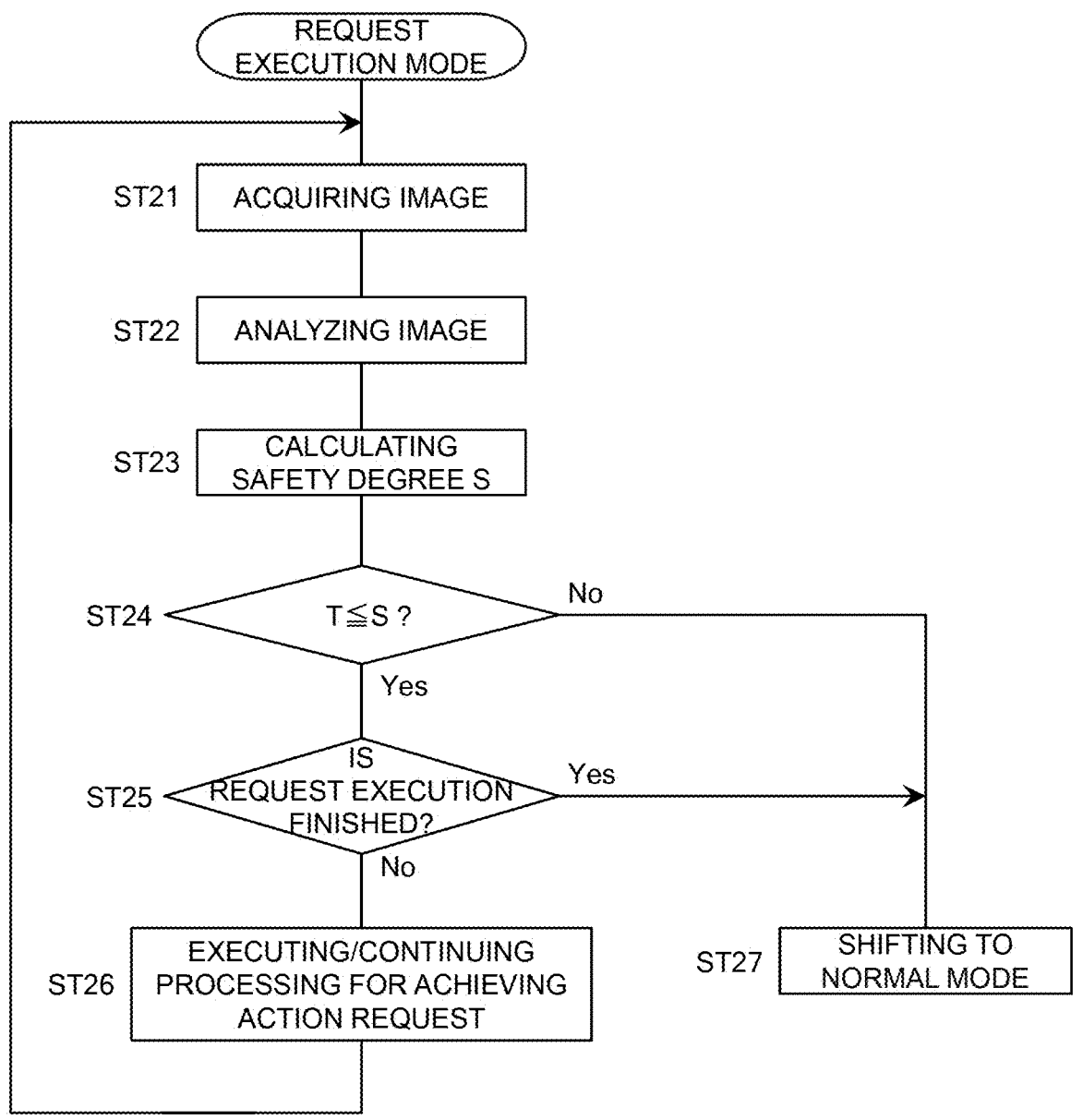
FIG. 5 is a flowchart presenting an operation example of the movement support device in a request execution mode.

FIG. 5 is a flowchart presenting an operation example of the movement support device 100 in the request execution mode. Each processing presented in FIG. 5 is executed by the controller 4, for example.

ST21 to 23 in FIG. 5 are similar to ST11 to 13 in FIG. 4. That is, the image acquisition unit 41 acquires an image captured by the camera 2 (ST21). The image analyzer 42 analyzes the image acquired in ST21 and detects an object in the image such as an obstacle, a target, or a person (ST22). The safety degree calculator 43 calculates the safety degree S based on the image (ST23). Specifically, the safety degree calculator 43 calculates the safety degree S based on the result of the image analysis in ST12.

Next, the decision unit 45 decides whether or not the safety degree S calculated by the safety degree calculator 43 in ST23 is the necessary safety degree T or more necessary for safely achieving the action candidate selected in ST14 of FIG. 4 (ST24). The necessary safety degree T is acquired in ST15 of the normal mode in FIG. 4, for example. When the safety degree S is less than the necessary safety degree T (No in ST24), the controller 4 shifts the operation mode from the current request execution mode to the normal mode (ST27). When the safety degree S is the necessary safety degree T or more (Yes in ST24), the process proceeds to next ST25.

In ST25, the controller 4 determines whether or not execution of the action candidate selected in ST14 of FIG. 4 has been completed (ST25). In this manner, the controller 4 decides whether or not the currently executed action request has been completed. When determining that the execution of the action request has been completed (Yes in ST25), the controller 4 shifts the operation mode from the current request execution mode to the normal mode (ST27). The operation mode may be manually changed by the user 90 operating the input unit 1.

When it is decided in ST25 that the execution of the action request has not been completed (No in ST25), the controller 4 executes processing for achieving the action request or continues the processing that is currently executed (ST26).

After executing ST26, the controller 4 returns to ST21 and repeats the flow presented in FIG. 3. That is, the flow presented in FIG. 3 is repeated at a constant period unless the process proceeds to ST27 and shifts to the request execution mode. In this manner, the image acquisition step of ST21 is repeated at a predetermined frame rate.

In the above description, an example of performing the image acquisition step, an image analysis step, and a calculation step of the safety degree S are performed in both the normal mode of FIG. 4 and the request execution mode of FIG. 5 has been described. However, the present disclosure is not limited to this. For example, the controller 4 may execute state, in parallel, transition processing such as a state machine that controls shift between the normal mode and the request execution mode, meanwhile always executing, in a predetermined period, the image acquisition step, the image analysis step, and the calculation step of the safety degree S.

4. Actions and Effects

As described above, in the present embodiment, the movement support device 100 that supports movement of the user 90 is provided. The movement support device 100 includes the camera 2, the controller 4, the storage 5, the input unit 1, and the output unit 3. The camera 2 captures an image of an environment around the user 90 to acquire a captured image (ST11). The controller 4 calculates the safety degree S indicating the level of safety regarding the user 90 based on the captured image (ST13). The storage 5 stores the necessary safety degree table 51. In the necessary safety degree table 51, a predetermined action candidate as an action that can be executed by the user 90 and the necessary safety degree T indicating the level of safety necessary for the user 90 to safely perform an action indicated by the predetermined action candidate are stored in association with each other. The input unit 1 receives input of a selection operation by the user 90. By the selection operation, the user 90 selects an action candidate desired by the user 90 from among predetermined action candidates. When there has been input of the selection operation (Yes in ST14), the controller 4 acquires the necessary safety degree T corresponding to a selected action candidate from the necessary safety degree table 51 (ST15). When the safety degree S having been calculated is less than the necessary safety degree T corresponding to the selected action candidate (No in ST14), the controller 4 does not support the user 90 in achieving the selected action candidate. When the safety degree S having been calculated is the necessary safety degree T or more corresponding to the selected action candidate (Yes in ST14), the controller 4 controls the output unit 3 to support the user 90 in achieving the selected action candidate.

When the user 90 achieves the action candidate selected when the safety degree S is less than the necessary safety degree T, there is a possibility that the safety of the user is not ensured. With the above configuration, when the safety degree S is less than the necessary safety degree T, the movement support device 100 does not support the user 90 in achieving the selected action candidate and can ensure the safety of the user 90. On the other hand, when the safety degree S is the necessary safety degree T or more, the movement support device 100 supports the user 90 in achieving the selected action candidate. In this manner, the movement support device 100 achieves a request of the user 90 while securing the safety of the user 90.

The controller 4 may operate to be switchable between the normal mode in which the output unit 3 is controlled to support movement of the user 90 and a request execution mode in which the output unit 3 is controlled to support the user 90 in achieving the selected action candidate. When the calculated safety degree S is less than the necessary safety degree T corresponding to the selected action candidate in a case of operating in the normal mode, the controller 4 does not need to switch the operation to the request execution mode. On the other hand, when the calculated safety degree S is the necessary safety degree T or more corresponding to the selected action candidate, the controller 4 may switch the operation to the request execution mode. When the calculated safety degree S is less than the necessary safety degree T corresponding to the selected action candidate in a case of operating in the request execution mode, the controller 4 may switch the operation to the normal mode.

By switching the mode to operate in this way, the movement support device 100 can achieve a request of the user 90 while securing the safety of the user 90.

The controller 4 may calculate the safety degree S based on at least one of the weather or brightness of the environment around the user 90, the condition of the ground where the user 90 is on, the presence or absence of an obstacle in the environment around the user 90, the nature of the obstacle, the presence or absence of a moving body in the environment around the user 90, and the nature of the moving body in the surrounding environment.

By calculating the safety degree S in line with a specific situation of the environment around the user 90 in this manner, it is possible to appropriately secure the safety of the user 90 depending on the specific situation. In a case where the safety degree S is high and appropriate, it is possible to achieve a request of the user 90.

5. Modifications

While the embodiment of the present disclosure has been described in detail above, the above description is merely an example of the present disclosure in all respects. Various improvements and modifications can be made without departing from the scope of the present disclosure. For example, the following changes can be made. In the following, the same reference numerals will be used for the same components as those of the above embodiment, and the description of the same points as those of the above embodiment will be omitted as appropriate.

5-1. First Modification

Figure 6:
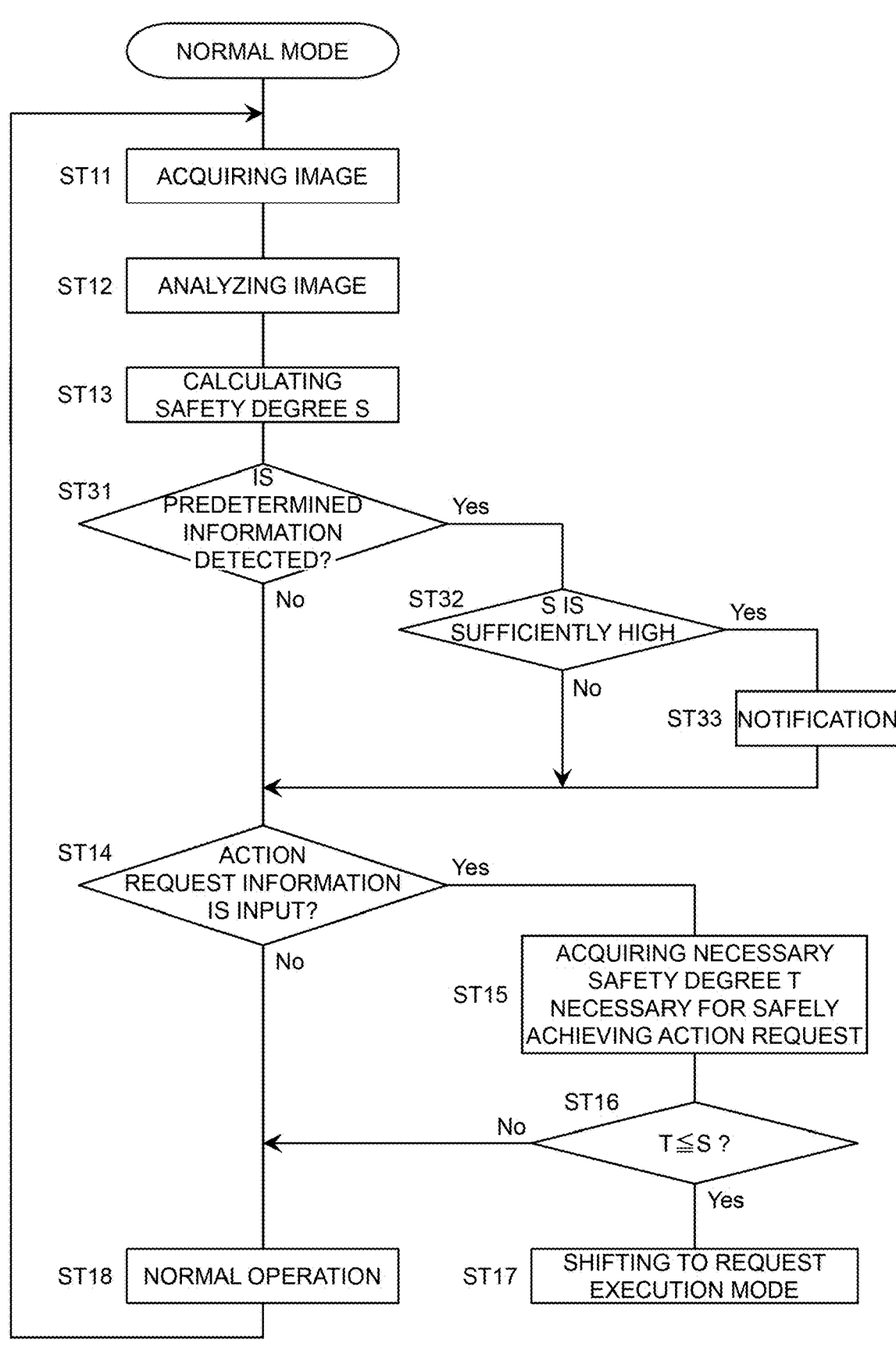
FIG. 6 is a flowchart presenting a modification of the operation of the movement support device in the normal mode.

FIG. 6 is a flowchart presenting a modification of the operation of the movement support device 100 in the normal mode. The flowchart of FIG. 6 further includes ST31 to 33 as compared with the flowchart of FIG. 3. In FIG. 6, after ST13, the controller 4 decides whether or not predetermined information has been detected from the captured image (ST31). The predetermined information includes various types of information such as, for example, the face of an acquaintance, a mark of a destination, a traffic light, and a road sign. Such information is stored in advance in the storage 5, for example.

When the predetermined information has been detected (Yes in ST31), the controller 4 determines whether or not the safety degree S is sufficiently high (ST32). For example, the controller 4 determines whether or not the safety degree S is a predetermined threshold value or more. When the safety degree S is sufficiently high (Yes in ST32), the controller 4 controls the output unit 3 to make a notification to the user 90 that the predetermined information has been detected and the content of the information (ST33). After the notification, the process proceeds to ST14.

As described above, when the predetermined information has been detected from the captured image (Yes in ST31) and the calculated safety degree S is the predetermined threshold value or more (Yes in ST32), the controller 4 may control the output unit 3 to make a notification to the user 90 (ST33). The predetermined information is stored in the storage 5, for example.

This allows the user 90 to know predetermined information by notification and can select an action candidate desired by the user 90 from among the predetermined action candidates by a selection operation based on the information.

When the predetermined information has not been detected in ST31 (No in ST31), the process proceeds to ST14.

When the safety degree S is not determined to be sufficiently high in ST32 (No in ST32), the process proceeds to ST14 without making a notification. In such a case, the controller 4 prioritizes movement and the like to a safe place so that, for example, the safety degree S becomes high. A notification made when the safety degree S is not sufficiently high sometimes causes the user 90 to distract consciousness of danger, and the possibility of harm to the user 90 increases. In order to prevent such risk, the controller 4 does not make a notification to the user 90 unless the safety degree S is sufficiently high.

5-2. Second Modification

As illustrated in FIG. 2, the decision unit 45 of the controller 4 may store the decided result information 52 into the storage 5. The decided result information 52 may include an element used for decision by the decision unit 45 and information indicating a decided result. For example, the decided result information 52 is a decided result table that stores the situation of the surrounding environment, the action request information of the user 90 in the situation, the safety degree S, and the necessary safety degree T in association with one another. The situation of the surrounding environment is information included in, for example, a captured image acquired by the image acquisition unit 41 and an analysis result by the image analyzer 42.

The decision of ST16 in FIG. 3 or ST24 in FIG. 5 by the controller 4 is sometimes different from that performed by a human. For example, even though it is obviously safe to achieve the request of the user 90 from the viewpoint of an accompanying person of the user 90, the decision unit 45 sometimes decides that the safety degree S is less than the necessary safety degree T in ST16 of FIG. 3 or ST24 of FIG. 5 (decides as No). In such a case, the controller 4 may perform machine learning using the information in the decided result table and the decision by the accompanying person of the user 90 to generate a learned model. The decision by the accompanying person of the user 90 is input to the controller 4 using the input unit 1, for example.

Such a learned model is generated, for example, by the controller 4 performing machine learning on a model (learning algorithm) such as a convolutional neural network (CNN). An example of the machine learning is supervised learning in which, with the decision by the accompanying person of the user 90 used as training data, a relationship between the captured image acquired by the image acquisition unit 41 and the safety degree S is learned. Supervised learning of a model such as CNN is performed by the controller 4 using backpropagation, for example.

In this manner, by performing machine learning, the safety degree S becomes appropriately calculated, and the decided result by the decision unit 45 becomes accurate. For example, when it is obviously safe to achieve the request of the user 90, the decision unit 45 no longer decides that the safety degree S is less than the necessary safety degree T in ST16 of FIG. 3 or ST24 of FIG. 5.

As another example of machine learning, the controller 4 may learn a relationship between the situation of the surrounding environment and the action request information input in ST14. This makes it possible to optimize the movement support device 100 to suit the preference of the user 90, and continuous use can reduce the number of times of input of the request by the user 90. For example, it is assumed that the user 90 continues to request every morning to get on a bus departing at a specific time. In this case, as a result of learning, when the user 90 leaves his/her house at a time within a specific range in the morning, the controller 4 performs navigation so that the user 90 is in time for the bus.

The generation result by machine learning of the learned model, or the like is stored in the storage 5, for example.

(Additional Note)

Hereinafter, various aspects according to the present disclosure will be described. It should be noted, however, that the references numerals described below are used for illustrative purposes only.

A movement support device 100 according to Aspect 1 of the present disclosure supports movement of a user 90, the movement support device 100 comprising:

an imaging device 2 that captures an image of an environment around the user 90 to acquire a captured image;

a controller 4 that calculates a safety degree S indicating a level of safety regarding the user 90 based on the captured image;

a storage 5 that stores a necessary safety degree table in which a predetermined action candidate as an action that can be executed by the user 90 and a necessary safety degree T indicating a safety degree S necessary for the user 90 to safely perform an action indicated by the predetermined action candidate are stored in association with each other;

an input unit 1 that receives input of a selection operation by the user 90 to select an action candidate desired by the user 90 from among the predetermined action candidates; and an output unit 3, wherein the controller 4 acquires a necessary safety degree T corresponding to a selected action candidate from the necessary safety degree table when there has been input of the selection operation, does not support the user 90 in achieving the selected action candidate when the safety degree S having been calculated is less than a necessary safety degree T corresponding to the selected action candidate, and controls the output unit 3 to support the user 90 in achieving the selected action candidate when the safety degree S having been calculated is a necessary safety degree T or more corresponding to the selected action candidate.

In accordance with Aspect 2 of the present disclosure, the movement support device 100 according to Aspect 1 is provided, wherein the controller 4 operates to be switchable between a normal mode in which the output unit 3 is controlled to support movement of the user 90 and a request execution mode in which the output unit 3 is controlled to support the user 90 in achieving the selected action candidate, the controller 4 does not switch operation to the request execution mode when the safety degree S having been calculated is less than a necessary safety degree T corresponding to the selected action candidate in a case of operating in the normal mode, and meanwhile switches operation to the request execution mode when the safety degree S having been calculated is a necessary safety degree T or more corresponding to the selected action candidate, and the controller 4 switches operation to the normal mode when the safety degree S having been calculated is less than a necessary safety degree T corresponding to the selected action candidate in a case of operating in the request execution mode.

In accordance with Aspect 3 of the present disclosure, the movement support device 100 according to Aspect 1 or 2 is provided, wherein the controller 4 calculates the safety degree S based on at least one of weather or brightness of an environment around the user 90, a condition of a ground of the user 90, presence or absence of an obstacle in an environment around the user 90, a nature of the obstacle, presence or absence of a moving body in an environment around the user 90, and a nature of the moving body.

In accordance with Aspect 4 of the present disclosure, the movement support device 100 according to any one of Aspects 1 to 3 is provided, wherein the controller 4 controls the output unit 3 to make a notification to the user 90 when predetermined information has been detected from the captured image and the safety degree S having been calculated is a predetermined threshold value or more.

In accordance with Aspect 4 of the present disclosure, a movement supporting method for supporting movement of a user 90 is provided. The movement supporting method comprises the steps of:

acquiring (ST11), by a controller 4, a captured image obtained by capturing an image of a surrounding environment of the user 90;

calculating (ST13), by the controller 4, a safety degree S indicating a level of safety regarding the user 90 based on the captured image;

receiving, by the controller 4, input of a selection operation by the user 90 to select an action candidate desired by the user 90 from among the predetermined action candidates; and acquiring (ST15), by the controller 4, a necessary safety degree T corresponding to a selected action candidate from a necessary safety degree table in which a predetermined action candidate as an action that can be executed by the user 90 and a necessary safety degree T indicating a safety degree S necessary for the user 90 to safely perform an action indicated by the predetermined action candidate are stored in association with each other when there has been input of the selection operation, wherein the controller 4 does not support the user 90 in achieving the selected action candidate when the safety degree S having been calculated is less than a necessary safety degree T corresponding to the selected action candidate, and performs output to support the user 90 in achieving the selected action candidate when the safety degree S having been calculated is a necessary safety degree T or more corresponding to the selected action candidate.

In accordance with Aspect 6 of the present disclosure, a program for causing a computer to execute the movement supporting method according to Aspect 5 is provided.

1 input unit
2 camera (imaging device)
3 output unit
4 controller
5 storage
6 communication interface
31 display
32 audio output unit
33 driver
41 image acquisition unit
42 image analyzer
43 safety degree calculator
44 necessary safety degree determinator
45 decision unit
46 output controller
51 necessary safety degree table
52 decided result information
90 user

91 robot
100 movement support device

The invention claimed is:

1. A movement support device that supports movement of a visually impaired user, the movement support device comprising:
an imaging device that captures an image of an environment around the user to acquire a captured image;
a controller that calculates a safety degree indicating a level of safety regarding the user based on the captured image;
a storage that stores a necessary safety degree table in which a predetermined action candidate as an action that can be executed by the user and a necessary safety degree indicating a safety degree necessary for the user to safely perform an action indicated by the predetermined action candidate are stored in association with each other;
an input unit that receives input of a selection operation by the user to select an action candidate desired by the user from among the predetermined action candidates; and
an output unit; and
a handle configured to be grasped by the user, wherein the controller
acquires a necessary safety degree corresponding to a selected action candidate from the necessary safety degree table when there has been input of the selection operation,
does not support the user in achieving the selected action candidate when the safety degree having been calculated is less than a necessary safety degree corresponding to the selected action candidate, and
controls the output unit to support the user in achieving the selected action candidate when the safety degree having been calculated is a necessary safety degree or more corresponding to the selected action candidate, and
wherein the movement support device is configured to support the movement of the visually impaired user by leading the visually impaired user in a self-propelled manner while the movement support device moves together with the user in a state in which the handle is grasped by the user,
wherein the selected action candidate comprises an action of supporting the movement of the visually impaired user, and
wherein the controller is configured to be switchable between a normal mode in which the controller performs movement control and a request execution mode in which the controller changes or suspends the movement control and supports the user in achieving the selected action candidate.

2. The movement support device according to claim 1, wherein the controller calculates the safety degree based on at least one of weather or brightness of an environment around the user, a condition of a ground of the user, presence or absence of an obstacle in an environment around the user, a nature of the obstacle, presence or absence of a moving body in an environment around the user, and a nature of the moving body.

3. The movement support device according to claim 1, wherein the controller controls the output unit to make a notification to the user when predetermined information has been detected from the captured image and the safety degree having been calculated is a predetermined threshold value or more.

4. A movement supporting method for supporting movement of a visually impaired user, performed by a controller of a movement support device which supports the movement of the visually impaired user in a self-propelled manner while the movement support device moves together with the user in a state in which a handle of the movement support device is grasped by the user, the movement supporting method comprising the steps of:
acquiring, by a controller, a captured image obtained by capturing an image of a surrounding environment of the user;
calculating, by the controller, a safety degree indicating a level of safety regarding the user based on the captured image;
receiving, by the controller, input of a selection operation by the user to select an action candidate desired by the user from among the predetermined action candidates, wherein the selected action candidate comprises an action of supporting the movement of the visually impaired user; and
acquiring, by the controller, a necessary safety degree corresponding to a selected action candidate from a necessary safety degree table in which a predetermined action candidate as an action that can be executed by the user and a necessary safety degree indicating a safety degree necessary for the user to safely perform an action indicated by the predetermined action candidate are stored in association with each other when there has been input of the selection operation, wherein the controller
does not support the user in achieving the selected action candidate when the safety degree having been calculated is less than a necessary safety degree corresponding to the selected action candidate, and
performs output to support the user in achieving the selected action candidate when the safety degree having been calculated is a necessary safety degree or more corresponding to the selected action candidate,
wherein the controller is configured to be switchable between a normal mode in which the controller performs movement control and a request execution mode in which the controller changes or suspends the movement control and supports the user in achieving the selected action candidate.

5. A non-transitory computer readable storage medium including a program for causing a computer to execute the movement supporting method according to claim 4.

* * * * *